United States Patent Office 3,469,105
Patented Sept. 23, 1969

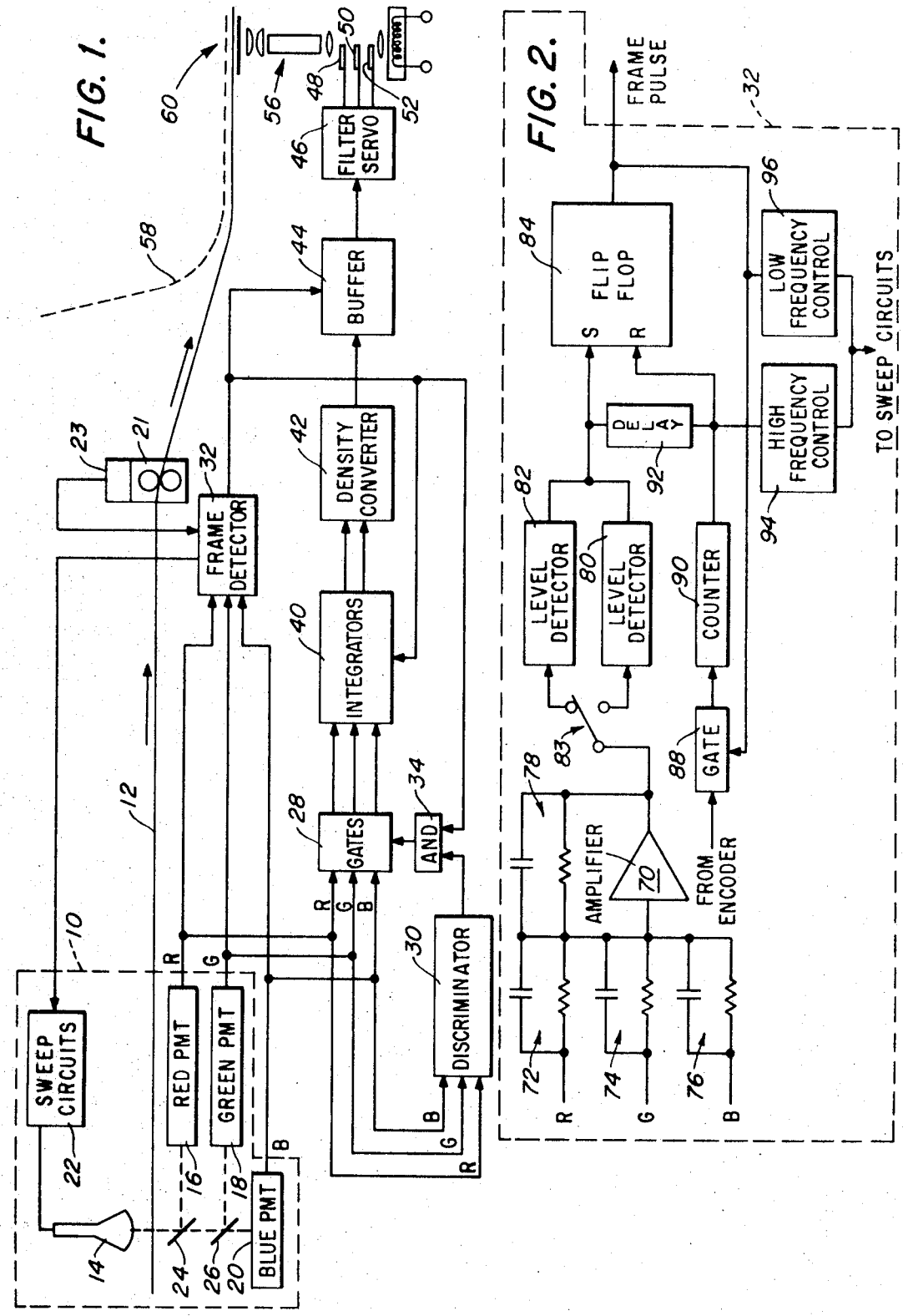

3,469,105
PHOTOELECTRIC APPARATUS FOR DETECTING THE BORDERS OF INFORMATION BEARING REGIONS OF RECORDS
Charles Marshall Stasey, Westwood, Mass., assignor to Itek Corporation, Lexington, Mass., a corporation of Delaware
Filed Sept. 5, 1967, Ser. No. 665,426
Int. Cl. G01n 21/30
U.S. Cl. 250—219                   24 Claims

ABSTRACT OF THE DISCLOSURE

Apparatus for detecting film frames including a cathode ray tube for illuminating the film, a photomultiplier tube to sense the intensity of the light from the film, drive means to move the film past the cathode ray and photomultiplier tubes, a summing amplifier tuned to the frequency with which the frames pass between the tubes, a level detector responsive to the summing amplifier to distinguish signals representative of border portions from those representative of the information bearing portions, a flip-flop circuit responsive to such signals to provide a frame detection indication, a film position encoder and a counter responsive thereto for enabling the flip-flop to respond to the level detector during the interval in which a border portion is expected to be sensed, and a delay circuit responsive to the counter to provide a substitute representation that a border portion has been sensed during that interval when one has not actually been sensed.

Characterization of invention

Apparatus for detecting discrete segments on a surface containing a plurality of such segments, each of said segments including an information bearing portion and contrasting border portions, comprising means for illuminating said surface, means for sensing the intensity of the light from said surface, drive means for moving one of said surface and said means for sensing relative to the other to successively sense a series of said segments, means, responsive to said means for sensing, for distinguishing light intensity levels representative of the sensing of a said border portion.

Summary of invention

This invention relates to apparatus for detecting discrete segments on a surface containing a plurality of such segments, and more particularly to such an apparatus for distinguishing between frames on a film.

Film printed in continuous photographic systems may be previewed either by machine or human operators to determine the number of frames per unit length of the film and to determine any deviations in the spacing between the frames which might interfere with proper registration of the film relative to the system and cause the simultaneous printing of portions of more than one frame.

This type of error is particularly critical, for example, in printing machines which analyze frames of film seriatim at a first station and apply light at a second station to expose the frames through a filter system which is controlled for each frame according to its analysis at the first station. Proper registration is essential because at any particular time the instructions controlling the filter system must be those derived at the first station from the frame that is now at that second station.

Methods of synchronizing the analysis and the instructions with the presence of the corresponding frame include previewing the film for frame size and spacing and providing special instructions to the machine when spacing deviations are present, or previewing and premarking each of the frames for their positive recognition by the photographic processing system.

Accordingly it is an object of this invention to provide an apparatus for automatically detecting discrete segments on a surface containing a plurality of such segments each segment having an information bearing portion and contrasting border portions.

It is a further object of this invention to provide such an apparatus operable without human operators, without previewing of the surface, and without any marking of the surface.

It is a further object of this invention to provide such an apparatus adaptable for use in a photographic processing system to detect film frames and to synchronize each of the operations performed by the system with respect to individual frames.

It is a further object of this invention to provide such an apparatus which prevents areas within the information bearing portion of the film having characteristics similar to those of border portions from erroneously indicating a frame detection and which provides a substitute indication when no frame detection occurs during the interval when it was expected.

The invention is accomplished by apparatus for detecting segments on a surface containing a plurality of such segments, each segment having an information bearing portion and contrasting border portions. The apparatus includes: means for illuminating the surface; means for sensing the intensity of the light from the surface; drive means for moving one of the surface and the means for sensing relative to the other to successively sense a series of the segments; means, responsive to the means for sensing, for distinguishing light intensity levels representative of the sensing of a border portion from those representative of the sensing of an information bearing portion.

Preferred embodiments of the invention may include means, responsive when enabled to the means for distinguishing, for indicating that a border portion has been detected and synchronizing means for enabling the means for indicating during the interval when the light intensity levels representative of the sensing of a border portion are expected. Other embodiments may include timing means, responsive to the synchronizing means, for providing the means for indicating with a substitute representation of the sensing of a border portion during that interval, should the means for distinguishing fail to distinguish light intensity levels representative of the sensing of a border portion.

Disclosure of preferred embodiment

Other objects, features and advantages will appear from the following description of a preferred embodiment of the invention as shown in the drawings, in which:

FIG. 1 is a diagram of a color printer machine using a frame detector according to this invention;

FIG. 2 is a detailed diagram of a frame detector according to this invention;

Figure 3:
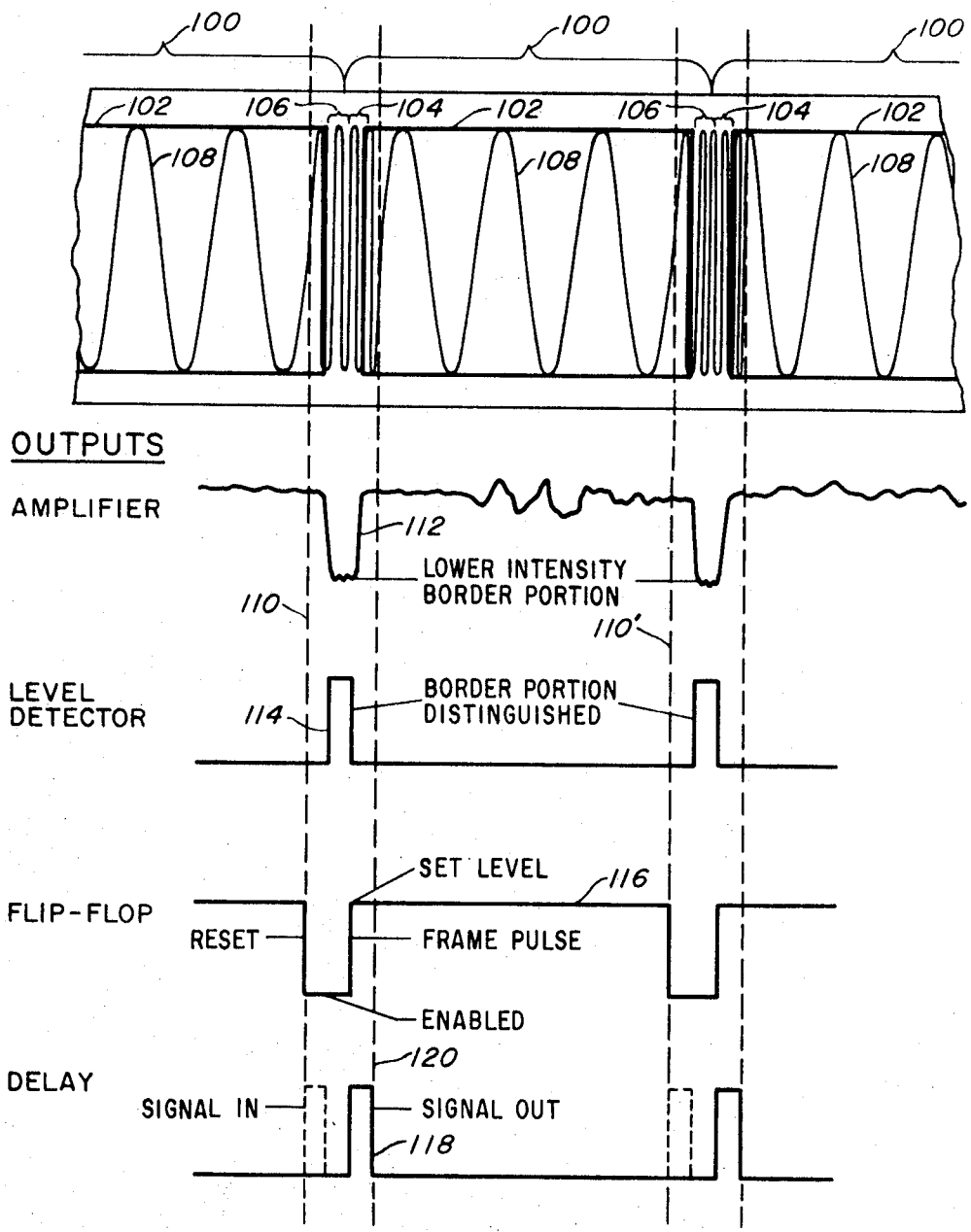
FIG. 3 is a timing diagram showing the operating relationship between the components of the frame detector of FIG. 2.

There is shown in FIG. 1 a color printer machine having a photometer section 10 for sensing the intensity of the colors present on frames of film 12 as it is moved past and between cathode ray tube scanner 14 and the red 16, green 18, and blue 20 photomultipliers by drive mechanism 21. Scanner 14 is driven by sweep circuits 22 to provide line scans transverse to the direction of motion of film 12, so that the resultant illumination of film 12 occurs in a sinusoidal path, FIG. 3. The red portion of the light passing through film 12 is reflected to red photomultiplier 16 by dichroic mirror 24 which reflects red light and passes blue and green light. Dichroic mirror 26 reflects green light to green photomultiplier 18 and passes blue light to blue photomultiplier 20. The outputs of photomultipliers 16, 18, and 20 representing the intensity of the colors sensed by them are supplied to gates 28, discriminator 30 and frame detector 32.

Discriminator 30 continuously analyzes the incoming intensity signals to detect concentrations of a single color in a particular frame and provides a signal to AND circuit 34 as long as no such concentration is detected. Frame detector 32 analyzes the incoming intensity signals and provides a signal to AND circuit 34 indicating that a new frame of the film is being sensed when it distinguishes signals representative of a border portion of a frame. Frame detector 32 is synchronized with drive mechanism 21 by means of encoder 23 whereby it can deliver a signal representative of the sensing of a border portion of a frame even when no border portion has been sensed as, for example, when two frames of a film overlap and there is no border portion between them, or when the similarity between the density of the information bearing portion of the film adjacent to the border and the density of the border portion is such that the two portions cannot be distinguished. Concurrence of signals from discriminator 30 and frame detector 32 indicates that the information bearing portion of the frame between the borders is being sensed and that no concentration of a single color has been sensed. Under these conditions AND circuit 34 permits the red, green, and blue intensity signals to pass through gates 28 to integrators 40 where these signals are individually accumulated during the sensing of the entire information bearing portion of a frame. Since the signal from frame detector 32 also enables the information in integrators 40 to pass to density converter 42 and from gates 28 to integrator 40, the signal to gates 28 may be delayed with respect to the signal to integrators 40 to prevent mixing of the signals from adjacent frames, or a second set of integrators may be used so that one set is connected to gates 28 while the other is connected to density converter 42.

Density converter 42 logarithmically converts the analog red, green, and blue intensity signals to digital density signals and delivers them to buffer 44 which eventually delivers them to filter-servo 46. Cyan 48, magenta 50, and yellow 52 filters are interjected into the light path in optical apparatus 56 in accordance with the density signals supplied by buffer 44 to filter-servo 46 to properly adjust the light used to expose the print stock 58 through film 12 at printing station 60. Buffer 44 coordinates delivery of the density signals derived from a particular frame by photometer 10 with arrival of that particular frame at printing station 60 by delaying delivery until the number of frames detected by frame detector 32 since that particular frame was sensed is equal to the number of frame lengths a frame must travel between photometer 10 and printing station 60.

Frame detector 32 is shown in more detail in FIG. 2 where summing amplifier 70 receives the red, green, and blue intensity signals through three resistor-capacitor (RC) filters 72, 74, and 76, respectively, tuned to enhance signals at the frequency at which border portions of the frames pass through photometer 10. A fourth filter 78 may be provided as a feedback path for the amplifier to further peak the amplifier response. The signals are summed in amplifier 70 and the resulting intensity signal is delivered to either one of level detectors 80 and 82 by switch 83. If the film being processed is a negative the signals are directed to level detector 80 which detects the positive peaks representative of the border portion whose transmittance is relatively high compared to the information bearing portion. If the film is a positive the signals are directed to level detector 82 which detects the negative peaks representative of the border portion whose transmittance is relatively low compared to the information bearing portion. In this embodiment film 12 is considered to be a positive and switch 83 is in contact with level detector 82.

When the portion of the signal representing that a border is being sensed is distinguished by level detector 82 a pulse is delivered to flip-flop 84. If flip-flop 84 is in the reset condition the lagging side of that pulse will then trigger flip-flop 84 and produce a frame pulse indicating that a frame has been detected. Thus, without previewing, premarking or other special provision the frame detector detects and indicates transition between individual frames in a series of frames. Of course, the leading edge of the pulse delivered to flip-flop 84 may also be used to trigger flip-flop 84.

Often the information bearing portion of the frames will contain areas which have a transmittance similar to that of a border portion. To prevent these areas from falsely triggering a frame pulse a synchronizing means has been used to reset flip-flop 84 just prior to the time a border portion is expected to be sensed. Thus, spurious signals falsely indicating a border portion cannot trigger flip-flop 84 while it is in the set condition during the sensing of the information bearing portion of the frame.

Synchronization is accomplished by encoder 23, FIG. 1, gate 88 and counter 90. Encoder 23 is connected with drive mechanism 21 and delivers a train of digital signals as a function of the distance travelled by film 12. Gate 88 is responsive to a frame pulse from flip-flop 84 to pass those digital signals to counter 90. Upon reaching a predetermined count which is a function of the distance travelled by film 12, counter 90 delivers a signal to reset flip-flop 84 enabling it to be triggered by a signal from detector 82, delivers a signal to delay 92, and delivers a signal to high frequency control 94 to increase the sweep frequency of scanner 14 during the interval when a border portion is expected to be sensed. Delay 92 is set to deliver a pulse to flip-flop 84 towards the end of the interval when a border is expected to be sensed. Thus, even if no border portion is sensed a frame pulse is produced by flip-flop 84 and the timing of the entire machine is preserved by this approximation and will be verified by the actual sensing of the next border portion. Such failure to sense a border portion is often due to a similarity between the density of the information bearing portion of the film adjacent the border and the density of the border portion or a misalignment of the film during initial exposure which results in the information bearing portions of two frames being contiguous. The production of the frame pulse, however generated, by flip-flop 84 enables gate 88 to recycle counter 90 and causes low frequency control 96 to return sweep circuit 22 to the low sweep rate. The use of different sweep rates for the border and information bearing portions of the film is not essential to proper operation of the frame detector and may be eliminated in other embodiments. Separate sweep rates are used in the specific embodiment herein described because a first sweep rate is desirable for transferring information from the information bearing portion of the film to the system at a rate at which the system can best operate. A higher, second sweep rate is desirable for detecting a border portion because the portion of the system responsive to the detection signals can operate at higher speeds. The higher sweep rate also provides more scan lines per unit length of film thereby shortening the period between successive scan lines wherein a border portion may pass undetected.

The timing involved in the operation of the frame detector is shown in FIG. 3, with reference to a positive film. Film 12 has frames 100 having information bearing portions 102 and border portions 104 and 106. As the film moves to the left in FIG. 3, through photometer 10, portion 102 is sensed by the three photomultipliers as it is scanned by low frequency sweep 108. Just prior to the time scanner 14 illuminates border 106, counter 90 reaches the count at which it resets flip-flop 84, provides a pulse to delay 92 and triggers high frequency control 94. This point in time is represented by line 110. As borders 106 and 104 are sensed a negative pulse 112 is developed which causes level detector 82 to produce pulse 114. Since flip-flop 84 is enabled, it is triggered by the sharply descending lagging side of pulse 114 to the set (disabled) condition producing set level output 116, or the frame pulse. While at this level flip-flop 84 cannot again be triggered and it will not be reset until the time represented by line 110′ is reached. Had pulse 112 not been produced, pulse 118, the signal out of delay 92, would have occurred and triggered flip-flop 84 to carry on the timing of the system. Pulse 118 is provided to have its lagging, descending side coincident with the time represented by line 120. Times represented by lines 110 and 120 define the interval during which border portions are expected and will be accepted. Those occurring at other times are not accepted as they are unable to trigger disabled flip-flop 84.

It should be appreciated that the scanner or the entire photometer may be moved in addition to or instead of the film being moved, that the invention is applicable to monochromatic and black and white systems as well as to multi-color systems, that the frame detector may be used to detect frames or segments on films or surfaces having a single series of frames or segments or a plurality of such series.

Other embodiments will occur to those skilled in the art and are within the following claims.

What is claimed is:

1. An automatic frame detector for distinguishing frames on a film, each frame having an information bearing portion and contrasting border portions spaced at opposing ends of said information bearing portion in the direction of relative motion of said film, said detector comprising:
   means for illuminating said film,
   means for sensing the intensity of the light from said film,
   drive means for moving one of said films and said means for sensing relative to the other to successively sense a series of said frames,
   means, responsive to said means for sensing, for distinguishing light intensity levels representative of the sensing of a said border portion.

2. The frame detector of claim 1 further comprising means, responsive, when enabled, to said means for distinguishing, for indicating that a said border portion has been detected.

3. The frame detector of claim 2 further comprising synchronizing means for enabling said means for indicating during the interval when said light intensity levels representative of the sensing of a said border portion are expected.

4. The frame detector of claim 3 further comprising timing means, responsive to said synchronizing means, for providing to said means for indicating a substitute representation of the sensing of a said border portion during said interval if said means for distinguishing has not distinghished light intensty levels representatve of the sensing of a said border portion.

5. The frame detector of claim 1 in which said means for illuminating includes a scanner for scanning across said film transverse to the direction of relative movement of said film and said means for sensing.

6. The frame detector of claim 1 in which said means for sensing includes a photosensitive device.

7. The frame detector of claim 1 in which said means for sensing includes three photosensitive devices each one primarily responsive to one of the primary colors red, blue, and green.

8. The frame detector of claim 1 in which said means for sensing further includes an amplifier tuned to the frequency at which said border portions appear at said sensing means.

9. The frame detector of claim 3 in which said illuminating means includes:
   a cathode ray tube and sweep circuits for driving the beam of said tube,
   said sweep circuits including a high frequency control, responsive to said synchronizing means, to increase the sweep frequency of said beam during said intervals and a low frequency control, responsive to said means for indicating, to decrease the sweep frequency of said beam between said intervals.

10. The frame detector of claim 1 in which said drive means moves said film and said means for sensing is stationary.

11. The frame detector of claim 3 in which said synchronizing means includes:
   an encoder, associated with said drive means, for indicating changes in relative positions of said film and said means for sensing, and
   means, responsive to said encoder, for measuring changes in relative positions of said film and said means for sensing.

12. The frame detector of claim 11 in which said encoder provides a digital signal for indicating the change in relative positions of said film and said sensing means and said means for measuring includes:
   a counter, responsive to said digital signal,
   gating means connected between said encoder and counter and responsive to said means for indicating for recycling said counter.

13. The frame detector of claim 1 in which said film is between said sensing means and said illuminating means.

14. Apparatus for detecting discrete segments on a surface containing a plurality of such segments, each of said segments including an information bearing portion and contrasting border portions, comprising:
   means for illuminating said surface,
   means for sensing the intensity of the light from said surface,
   drive means for moving one of said surface and said means for sensing relative to the other to successively sense a series of said segments,
   means, responsive to said means for sensing, for distinguishing light intensity levels representative of the sensing of a said border portion,
   means, responsive, when enabled, to said means for distinguishing, for indicating that a said border portion has been detected, and
   synchronozing means for enabling said means for indicating during the interval when said light intensity levels representative of the sensing of a said border portion are expected.

15. The apparatus of claim 14 further comprising timing means, responsive to said synchronizing means, for providing to said means for indicating a substitute representation of the sensing of a said border portion during said interval if said means for distinguishing has not distinguished light intensity levels representative of the sensing of a said border portion.

16. The apparatus of claim 14 in which said means for illuminating includes a scanner for scanning across said surface transverse to the direction of relative movement of said surface and said means for sensing.

17. The apparatus of claim 14 in which said means for sensing includes a photosensitive device.

18. The appartaus of claim 14 in which said means for sensing includes three photosensitive devices each one primarily responsive to one of the primary colors red, blue, and green.

19. The apparatus of claim 14 in which said means for sensing further includes an amplifier tuned to the frequency at which said border portions appear at said sensing means.

20. The apparatus of claim 14 in which said illuminating means includes:

a cathode ray tube and sweep circuits for driving the beam of said tube, said sweep circuits including a high frequency control, responsive to said synchronizating means, to increase the sweep frequency of said beam during said intervals and a low frequency control, responsive to said means for indicating, to decrease the sweep frequency of said beam between said intervals.

21. The apparatus of claim 14 in which said drive means moves said surface and said means for sensing is stationary.

22. The apparatus of claim 14 in which said synchronizing means includes:

an encoder, associated with said drive means, for indicating changes in relative positions of said surface and said means for sensing, and means, responsive to said encoder, for measuring changes in relative positions of said surface and said means for sensing.

23. The apparatus of claim 22 in which said encoder provides a digital signal for indicating the change in relative positions of said film and said sensing means and said means for measuring includes:

a counter, responsive to said digital signal, gating means connected between said encoder and counter and responsive to said means for indicating for recycling said counter.

24. The apparatus of claim 14 in which said surface is between said sensing means and said illuminating means.

References Cited

UNITED STATES PATENTS 2,947,810  8/1960  Horsley _____ 355—38

RALPH G. NILSON, Primary Examiner

T. N. GRIGSBY, Assistant Examiner

U.S. Cl. X.R.

250—214; 355—38